US011167765B2

(12) United States Patent
Naitou et al.

(10) Patent No.: US 11,167,765 B2
(45) Date of Patent: Nov. 9, 2021

(54) WORK VEHICLE (71) Applicant: HITACHI CONSTRUCTION MACHINERY CO., LTD., Tokyo (JP)

(72) Inventors: Keisuke Naitou, Kobe (JP); Ryou Taniguchi, Kakogawa (JP)

(73) Assignee: HITACHI CONSTRUCTION MACHINERY CO., LTD., Tokyo (JP)

(*) Notice: Subject to any disclaimer, the term of this patent is extended or adjusted under 35 U.S.C. 154(b) by 0 days.

(21) Appl. No.: 16/641,769

(22) PCT Filed: Mar. 5, 2019

(86) PCT No.: PCT/JP2019/008656
§ 371 (c)(1),
(2) Date: Feb. 25, 2020

(87) PCT Pub. No.: WO2019/188047
PCT Pub. Date: Oct. 3, 2019

(65) Prior Publication Data
US 2020/0247418 A1 Aug. 6, 2020

(30) Foreign Application Priority Data

Mar. 27, 2018 (JP) .............................. JP2018-059986

(51) Int. Cl.
*B60W 30/19* (2012.01)
*B60W 10/11* (2012.01)

(52) U.S. Cl.
CPC ............ *B60W 30/19* (2013.01); *B60W 10/11* (2013.01); *B60W 2300/17* (2013.01); *B60W 2520/10* (2013.01); *B60W 2520/16* (2013.01)

(58) Field of Classification Search
CPC .. B60W 30/19; B60W 10/11; B60W 2300/17; B60W 2520/10; B60W 2520/16
See application file for complete search history.

(56) References Cited

U.S. PATENT DOCUMENTS 8,068,963 B2 * 11/2011 Sugiura ............... F16H 61/0213
701/51
8,370,032 B2 * 2/2013 Choby .................... F16H 59/66
701/51

(Continued)

FOREIGN PATENT DOCUMENTS

JP 01-109131 A 4/1989
JP 02-031941 A 2/1990

(Continued)

OTHER PUBLICATIONS

Machine translation of JPH0231941 filed Mar. 11, 2021 (Year: 2021).*

(Continued)

*Primary Examiner* — Tisha D Lewis
(74) *Attorney, Agent, or Firm* — Mattingly & Malur, PC (57) ABSTRACT Provided is a wheel loader in which the speed position of the transmission can be easily changed with a small number of switches. The wheel loader 1 includes a tilting angle sensor 9 for detecting the tilting angle of the vehicle body. In case that the vehicle body is traveling on an uphill or a downhill with a transmission 33 in a higher speed position than the lowest speed position, and the tilting angle detected by the tilting angle sensor 9 is not smaller than a prescribed threshold value, a transmission control device 45 sends the transmission 33 a command to downshift the transmission 33 one speed position by each operation of a shiftdown switch 62.

3 Claims, 7 Drawing Sheets (56) References Cited

U.S. PATENT DOCUMENTS

| | | | | |
|---|---|---|---|---|
| 9,383,002 B2* | 7/2016 | Tanaka | ................ | F16H 59/0204 |
| 2019/0390435 A1* | 12/2019 | Harada | ................... | E02F 9/262 |

FOREIGN PATENT DOCUMENTS

| | | | |
|---|---|---|---|
| JP | 08-188059 A | 7/1996 | |
| JP | 2004-100156 A | 4/2004 | |
| JP | 2009-156434 A | 7/2009 | |
| JP | 2014-083855 A | 5/2014 | |

OTHER PUBLICATIONS

International Search Report of PCT/JP2019/008656 dated Apr. 23, 2019.

* cited by examiner

WORK VEHICLE

TECHNICAL FIELD

The present invention relates to work vehicles such as wheel loaders.

BACKGROUND ART

In a wheel loader as a work vehicle, a large travel driving force is required for excavation, so the speed position of the transmission is changed to the first speed as the lowest speed position to carry out the work. For shift to the first speed, the system which includes a manual operation device for downshifting the speed position of the transmission one speed position by each operation and another operation device for downshifting the transmission in the second speed position to the lowest speed position and hold it in the lowest speed position has been traditionally known (for example, Patent Literature 1).

CITATION LIST

Patent Literature

PATENT LITERATURE 1: Japanese Patent Application Laid-Open No. 2014-83855

SUMMARY OF INVENTION

Technical Problem

Excavation work with a wheel loader is mainly carried out on a flat ground. In excavation work, for the purpose of increasing the working speed and improving the working efficiency, it is desirable to move to the object of excavation quickly and promptly change the transmission to the first speed in the vicinity of the object of excavation. For this purpose, it is necessary to keep traveling at a high speed with a high speed position toward the object of excavation and change to the first speed just before the object of excavation; in the above conventional technique, however, the vehicle must come close to the object of excavation at the second speed and downshift to the lowest speed position by a single operation of the operation device or downshift step by step according to the distance to the object of excavation, using the other operation device for downshifting one speed by each operation, so it is difficult to come close to the object of excavation quickly. In addition, the operator has to use these operation devices selectively, so operation is complicated and it has been difficult for an unexperienced operator to operate the system.

An object of the present invention is to provide a wheel loader in which the speed position of the transmission can be easily changed with a small number of switches.

Solution to Problem

In order to achieve the above object, a typical work vehicle according to the present invention is characterized by including: a vehicle body with a pair of wheels attached to each of the front and rear; a working device provided on the vehicle body; an engine configured to generate a travel driving force for the vehicle body; a transmission with a plurality of speed positions to which the driving force of the engine is transmitted through a torque converter; a shiftdown switch configured to give the transmission a command to downshift the speed position by operation; a speed sensor configured to detect the speed of the vehicle body; and a transmission control device configured to control the speed position of the transmission according to a command signal given from the shiftdown switch or the speed of the vehicle body detected by the speed sensor, in which a tilting angle detector configured to detect the inclination of the vehicle body is provided, and the transmission control device takes the command signal given to the transmission by a single operation of the shiftdown switch as a command to downshift one speed position at a time or a command to downshift to the lowest speed position, according to the speed position of the transmission during traveling of the vehicle body, the speed of the vehicle body detected by the speed sensor, and the tilting angle detected by the tilting angle detector.

Advantageous Effects of Invention

According to the present invention, the speed position of the transmission can be easily changed with a small number of switches. The further objects, elements and effects of the invention will more fully appear from the description of the embodiment mentioned below.

DESCRIPTION OF EMBODIMENT

Next, the wheel loader as a work vehicle according to the present invention will be described referring to drawings.

Figure 1:
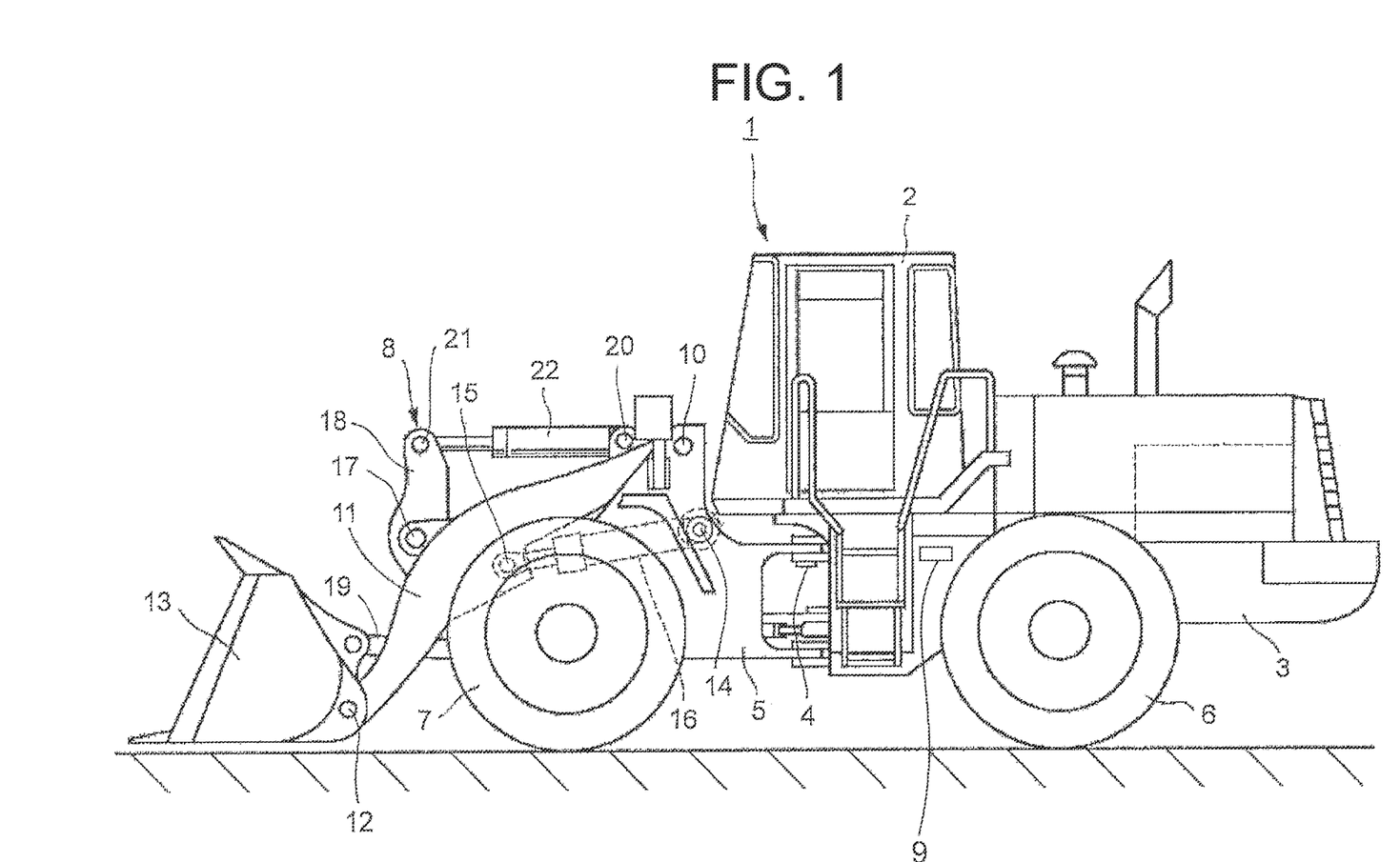
FIG. 1 is an external view of the wheel loader according to an embodiment.
Figure 2:
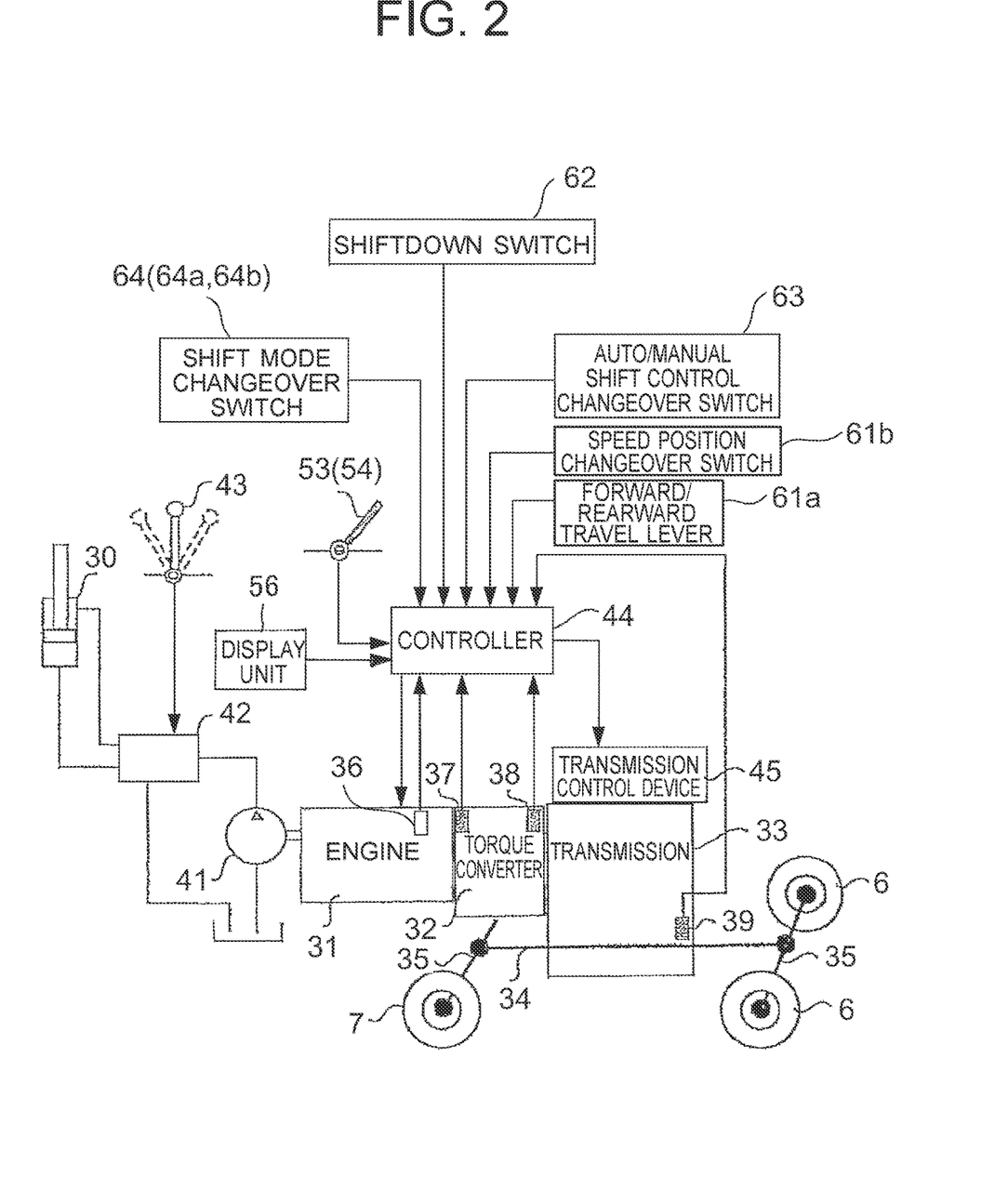
FIG. 2 is a system configuration diagram of the wheel loader according to the embodiment.

FIG. 1 is an external view of the wheel loader according to an embodiment and FIG. 2 is a system configuration diagram of the wheel loader according to the embodiment. As shown in FIG. 1, the wheel loader 1 according to the embodiment is mainly composed of: a rear frame 3 with a cab 2; a front frame 5 coupled to the front side (forward travel side of the wheel loader 1) of the rear frame 3 through a coupling pin 4; a rear wheel 6 and a front wheel 7 provided on the rear frame 3 and the front frame 5; and a working device 8 attached to the front part of the front frame 5. In this specification, the rear frame 3 and the front frame 5 are collectively called the "vehicle body". The vehicle body is provided with a tilting angle sensor 9 configured to detect the ground angle, and the ground angle of the vehicle body as detected by the tilting angle sensor 9 is entered into the controller 44 which will be described later, to detect that the wheel loader 1 is travelling on an uphill, a downhill or a flat ground.

The working device 8 includes: a boom 11 with one end coupled to the front frame 5 through a coupling pin 10; a bucket 13 coupled to the tip of the boom 11 through a coupling pin 12; a boom cylinder 16 with both ends coupled to the front frame 5 and the boom 11 through coupling pins 14 and 15; a bell crank 18 swingably coupled to the boom 11 through a coupling pin 17; a link member 19 with one end coupled to the bell crank 18 and the other end coupled to the bucket 13; and a bucket cylinder 22 with both ends coupled to the front frame 5 and the bell crank 18 through coupling pins 20 and 21. The boom 11 is vertically rotated (elevated) by driving the boom cylinder 16 and the bucket 13 is vertically rotated (dumping or crowding) by driving the bucket cylinder 22.

In this example, only one member is provided as each of the boom 11, coupling pins 12, 14, and 15, and boom cylinder 16, but in the real machine, these members are each provided as one pair on the left and right of the bucket 13. In this specification, the boom cylinder 16 and the bucket cylinder 22 are collectively called the "working actuator 30".

The wheel loader 1, which is operated by an operator in the cab 2, performs work such as excavation, loading or the like while traveling on a flat ground, an uphill or a downhill.

As shown in FIG. 2, the wheel loader 1 according to the embodiment includes an engine 31 as a driving source. The output axis of the engine 31 is coupled to the input axis (not shown) of a torque converter 32 (hereinafter called the tor-con) and the output axis (not shown) of the tor-con 32 is coupled to the transmission 33. The tor-con 32 is a fluid clutch including an impeller, a turbine, and a stator which are known, and the rotation of the engine 31 is transmitted to the transmission 33 through the tor-con 32.

The transmission 33 has a hydraulic clutch which changes its speed position from the first speed to the fifth speed and the speed of rotation of the output axis of the tor-con 32 is changed by the transmission 33. The rotation after the speed change is transmitted to the rear wheels 6 and front wheels 7 through a propeller shaft 34 and an axle 35 so that the wheel loader 1 travels. The rotational speed of the engine 31 is detected by an engine rotational speed sensor 36. A rotational speed sensor 37 is provided on the input axis of the tor-con 32, a revolving sensor 38 is provided on the output axis of the tor-con 32, and a revolving sensor configured to detect the vehicle speed (vehicle speed sensor) 39 is provided on the propeller shaft 34.

A hydraulic pump 41 is driven by the engine 31 and the oil discharged from the hydraulic pump 41 is led through a direction control valve 42 into the working actuator 30 such as the boom cylinder 16. The direction control valve 42 is driven by operation of a working device lever 43 and the working actuator 30 is expanded or contracted according to the manipulated variable of the working device lever 43.

The tor-con 32 has the function to increase the output torque with respect to the input torque, namely the function to make the torque ratio 1 or more. The torque ratio becomes smaller as the tor-con speed ratio e (=Nt/Ni) as the ratio between the rotational speed Ni of the input axis of the tor-con 32 and the rotational speed Nt of its output axis increases. For example, in case that the traveling load becomes larger during traveling with the engine rotational speed constant, the rotational speed of the output axis of the tor-con 32, namely the vehicle speed, decreases and the tor-con speed ratio e becomes smaller. At this time, the torque ratio increases, so the wheel loader 1 can travel with a larger driving force (tractive force).

The transmission 33 is a speed change gear with solenoid valves corresponding to various speed positions. The solenoid valves are driven by a control signal sent from the controller 44 to a transmission control device (change gear control device) 45 and thereby the speed position is changed between the first speed and the fifth speed. In this embodiment, for example, the first speed position to the fifth speed position are provided as the speed positions of the transmission 33.

Figure 3:
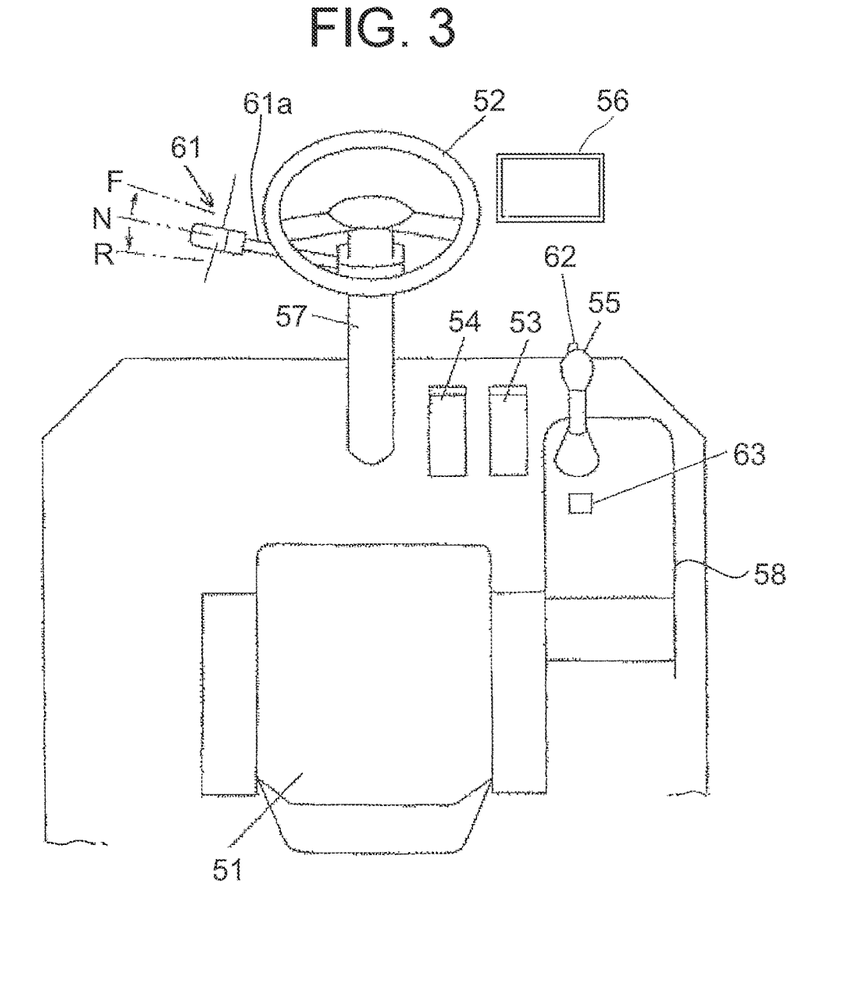
FIG. 3 is a top view which shows the area around the driver's seat of the wheel loader.

FIG. 3 is a top view which shows the area around the driver's seat of the wheel loader. As shown in FIG. 3, there are provided, in the cab 2 of the wheel loader 1, a driver's seat 51 on which the operator is seated, a steering wheel 52 for steering the wheel loader 1, an accelerator pedal 53, a brake pedal 54, a working device lever 55 for operating the working device 8, and a display unit 56 with a touch panel such as a liquid crystal display unit. The display unit 56 enables the operator to enter various kinds of information by operating the touch panel.

The driver's seat 51 is located almost in the center of the cab 2 in the vehicle widthwise direction. The steering wheel 52 is located in front of the driver's seat 51. The accelerator pedal 53 and the brake pedal 54 are arranged left and right laterally to the base part of a steering column 57 for supporting the steering wheel 52. The working device lever 55 for handling the boom 11 and bucket 13 is located at the front end of the upper surface of a console 58 located on the right lateral side of the driver's seat 51. The display unit 56 is located in front of the driver's seat 51 in such a position that the operator can easily view it. Furthermore, under the steering wheel 52, a forward/rearward travel lever device 61 which is manually switched is provided, protruding laterally from the steering column 57.

Figure 4A:
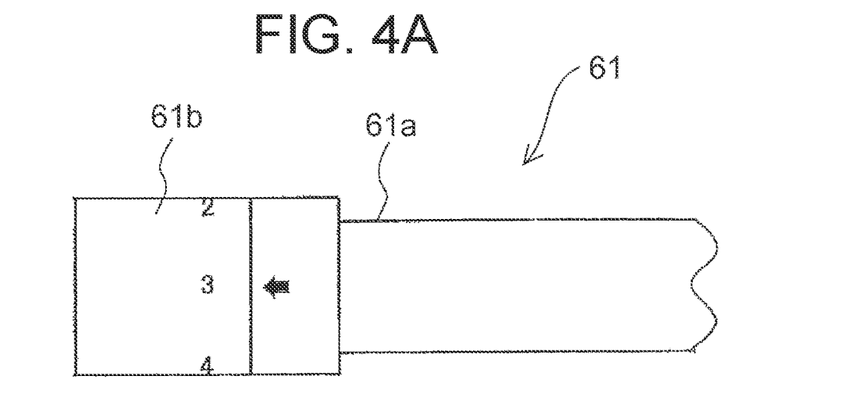
FIG. 4A is an enlarged side view of the forward/rearward travel lever device according to the embodiment.
Figure 4B:
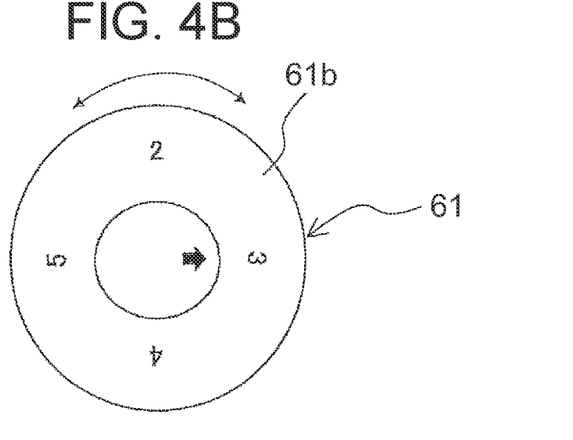
FIG. 4B is a front view of the forward/rearward travel lever device according to the embodiment.

FIG. 4A and FIG. 4B are structural diagrams of the forward/rearward travel lever device according to the embodiment. As shown in FIG. 4A and FIG. 4B, the forward/rearward travel lever device 61 has a forward/rearward travel lever 61*a* and outputs a forward travel command signal to call for forward travel, a rearward travel command signal to call for rearward travel, or a neutral command signal to call for neutrality according to operation of the forward/rearward travel lever 61*a*. The forward/rearward travel lever 61*a* is structured so that it can be switched to the forward travel position F to call for forward travel, the rearward travel position R to call for rearward travel, or the neutral position N to call for neutrality and can be held in each of the forward travel position F, rearward travel position R, and neutral position N.

The forward/backward travel lever 61*a* protrudes leftward from the steering column 57 and is located so that the operator can handle it by the left hand. On the other hand, the working device lever 55 is located forward and leftward in the cab 2 so that the operator can handle it by the right hand.

In addition, a speed position changeover switch 61*b* having the function as a speed change lever is provided on the free end side of the forward/backward travel lever 61*a*. The speed position changeover switch 61*b* is located concentrically with the forward/backward travel lever 61*a* and can rotate around the center axis of the forward/backward travel lever 61*a*. As shown in FIG. 4B, the speed position changeover switch 61*b* in this example is structured so that the speed position of the transmission 33 can be changed to four steps, namely the second speed, third speed, fourth speed, and fifth speed. FIG. 4A and FIG. 4B show the case that the third speed is selected.

The working device lever 55 has a shiftdown switch 62 and a manual/auto shift control changeover switch 63 is provided on the console 58.

The shiftdown switch 62 is set so that the transmission 33 can be downshifted one speed position by each operation until it shifts to the lowest speed position. In addition, the shiftdown switch 62 is set so that when, with the transmission downshifted to the first speed by operating it, switching between the forward travel and rearward travel is made using the forward/backward travel lever 61*a*, then the fixed first speed state is cancelled and the vehicle is started at the second speed.

The shiftdown switch 62 is set so that when operated, it supersedes the speed position change operation by the speed position changeover switch 61*b*; for example, even if the third speed is selected by the speed position changeover switch 61*b*, downshifting to the second speed or first speed is performed each time the shiftdown switch 62 is operated.

When the first speed is selected by the shiftdown switch 62, upshifting to the second speed is automatically performed in case that the load on the working device (the load in excavation or the load in traveling on an uphill) becomes not more than a prescribed value.

The manual/auto shift control changeover switch 63 is a switch which switches to the manual shift to enable manual speed position change by operation of the speed position changeover switch 61*b* or to the auto shift to enable automatic speed position change with the speed position selected by the speed position changeover switch 61*b* as the upper limit. In state that the manual shift is selected, the speed position selected by the speed position changeover switch 61*b* is held under the control by the controller 44 which will be described later. On the other hand, in state that the auto shift is selected, automatic shift is performed according to the vehicle speed detected by the rotational speed sensor 39 with the speed position selected by the speed position changeover switch 61*b* as the upper limit under the control by the controller 44 which will be described later. In addition, the manual/auto shift control changeover switch 63 has the function to change between Auto Shift 1 in which the lowest speed position set by downshifting in the auto shift is the speed position used for start (second speed) and Auto Shift 2 in which it is the lowest speed position of the transmission (first speed).

In addition to the above various changeover switches 61*b*, 62 and 63, the wheel loader 1 according to the embodiment includes a shift mode changeover switch 64. The shift mode changeover switch 64 is a switch which selects either the first mode to downshift the speed position of the transmission 33 one speed by each operation or the second mode to downshift the transmission 33 to the lowest speed position (first speed) by a single operation, as the operation mode of the shiftdown switch 62.

Figure 5:
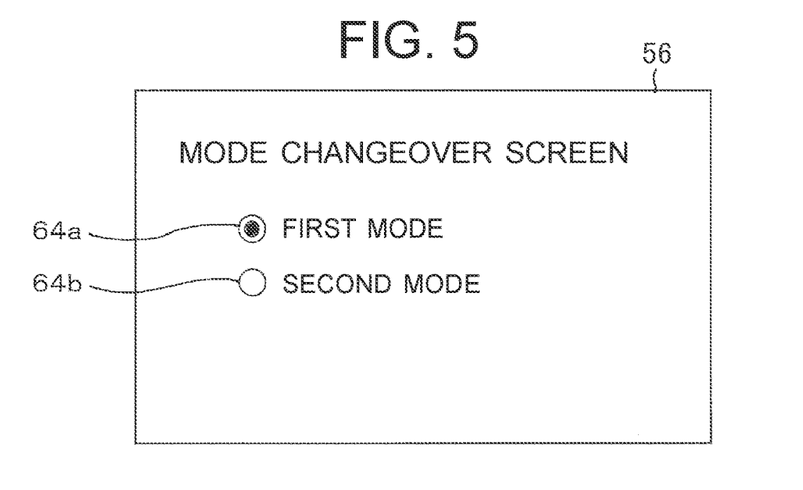
FIG. 5 is a view which shows a shift mode changeover switch according to the embodiment.

For example, the shift mode changeover switch 64 may be a mechanical switch, such as a push switch, located around the driver's seat 51 or displayed on the display unit 56. FIG. 5 shows an example of the display unit 56 which displays shift mode changeover switches 64*a* and 64*b*. As shown in FIG. 5, the shift mode changeover switch 64*a* changes the operation mode of the shiftdown switch 62 to the first mode and the shift mode changeover switch 64*b* changes the operation mode of the shiftdown switch 62 to the second mode.

As the operator touches the shift mode changeover switch 64*a*, a black circle (●) appears inside the shift mode changeover switch 64*a* represented by a white circle (○) and the operator can confirm that the first mode is selected. As the operator touches the shift mode changeover switch 64*b* in this state, a black circle (●) appears inside the shift mode changeover switch 64*b* represented by a white circle (○) and the black circle inside the shift mode changeover switch 64*a* disappears, and the operator can confirm that the second mode is selected.

Figure 6A:
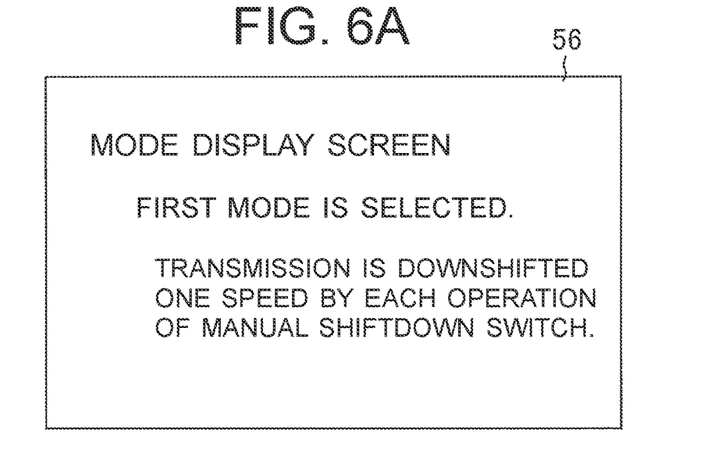
FIG. 6A is a view which shows the display content on the mode display screen of the display unit according to the embodiment when the first mode is selected.
Figure 6B:
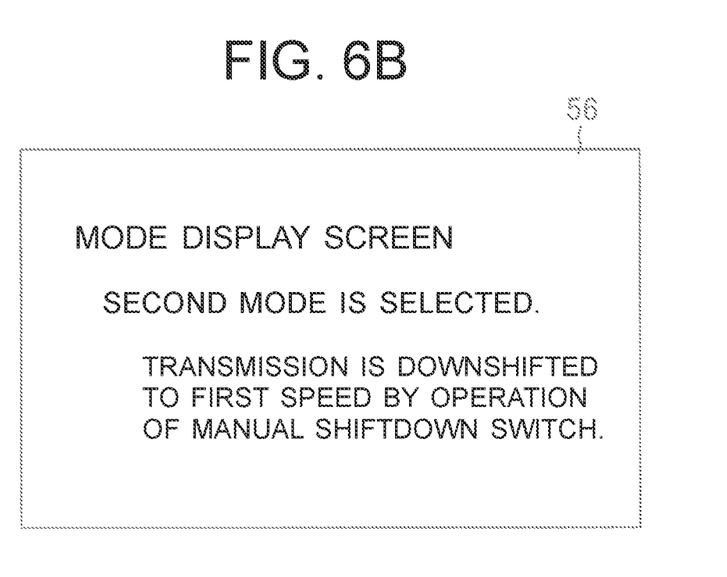
FIG. 6B is a view which shows the display content on the mode display screen of the display unit according to the embodiment when the second mode is selected.

FIG. 6A and FIG. 6B are views which show the mode display screen of the display unit according to the embodiment. In case that the operator selects the first mode by operating the shift mode changeover switch 64*a*, as shown in FIG. 6A, text data "FIRST MODE IS SELECTED. TRANSMISSION 33 IS DOWNSHIFTED ONE SPEED BY EACH OPERATION OF SHIFTDOWN SWITCH 62" appears on the display unit 56. On the other hand, in case that the operator selects the second mode by operating the shift mode changeover switch 64*b*, as shown in FIG. 6B, text data "SECOND MODE IS SELECTED. TRANSMISSION 33 IS DOWNSHIFTED TO FIRST SPEED BY OPERATION OF SHIFTDOWN SWITCH 62" appears on the display unit 56. Consequently, the operator can confirm that the shift mode has been changed.

As will be described later, the display unit 56 is connected to the controller 44 so that it displays various image data including the shift mode changeover switch 64 according to a display control signal from the controller 44 and also by operating the shift mode changeover switch 64*a*, 64*b* or the like, the controller 44 receives a signal sent from the display unit 56 and performs various drive control operations including speed position changeover control of the transmission 33.

Although FIG. 2 shows the controller 44 and the transmission control device 45 as separate units, the controller 44 and the transmission control device 45 may be integrated into one unit.

Figure 7:
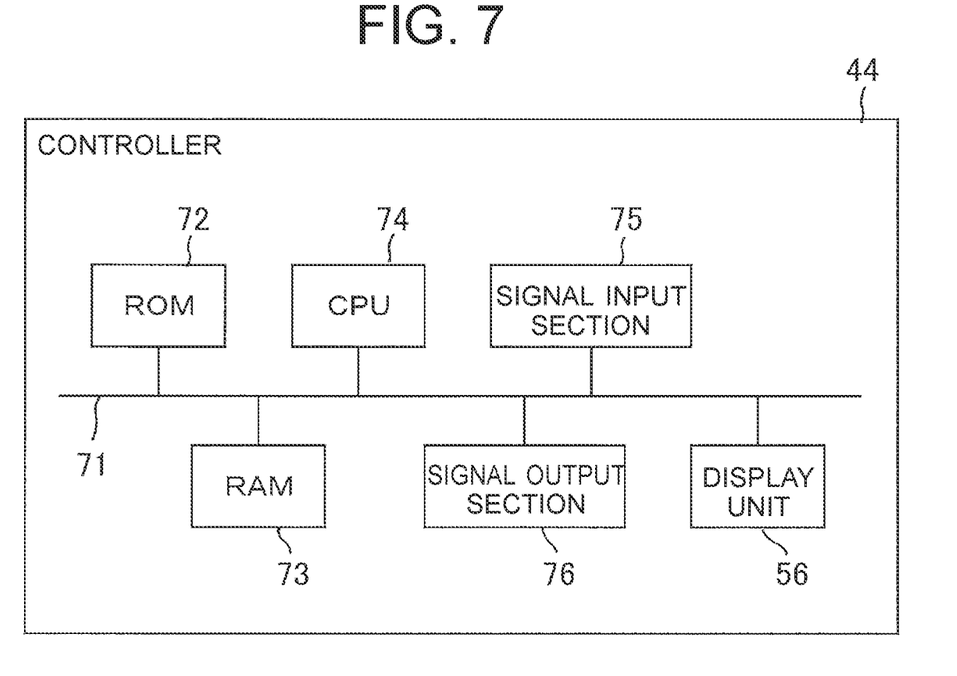
FIG. 7 is a functional block diagram of the controller according to the embodiment.

FIG. 7 is a functional block diagram of the controller according to the embodiment. As shown in FIG. 7, the controller 44 in this example is constituted by a computer which includes hardware resources such as a ROM (Read Only Memory) 72, a RAM (Random Access Memory) 73, a CPU (Central Processing Unit) 74, a signal input section 75, a signal output section 76, and a display unit 56. The transmission control device 45 is also constituted by the same computer as above except that it does not include the display unit 56.

The ROM 72 is a nonvolatile semiconductor memory which can hold a program and data even if the power is turned off. The ROM 72 may be an SD memory card, a micro SD memory card, a USB (Universal Serial Bus) memory or the like.

Figure 8:
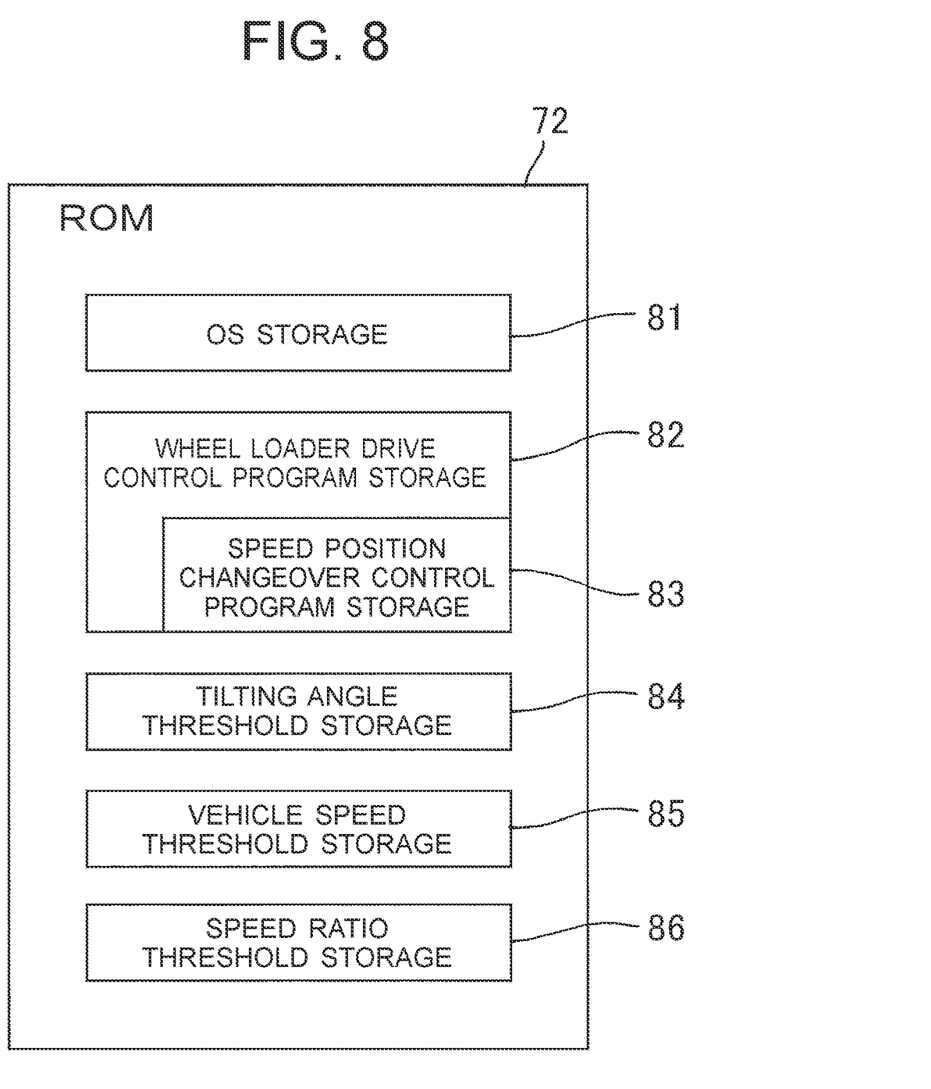
FIG. 8 is a format structure diagram of the ROM according to the embodiment.

FIG. 8 is a format structure diagram of the ROM according to the embodiment. As shown in FIG. 8, the ROM 72 includes: a storage 81 for an OS (Operating System) as basic software; a storage 82 for a drive control program which runs on the OS to control the drive of the wheel loader 1; a storage 83 for a changeover control program to control the speed position changeover of the transmission 33; a storage 84 for a tilting angle threshold value as a reference for changing the speed position of the transmission 33 to the first speed; and a storage 85 for a vehicle speed threshold value. The changeover control program is stored as part of the drive control program.

Regarding the tilting angle threshold, for example, the range from the tilting angle permitting uphill traveling at the highest speed with the highest speed position to the tilting angle of the downhill permitting coasting at that speed is set as a tilting angle threshold value for a flat ground. A tilting angle larger than the flat ground inclination range is set as an uphill ground and a tilting angle smaller than the range is set as a downhill ground. On an uphill ground, in case that the highest speed cannot be achieved with a high speed position, the speed position which enables the speed required to climb the ground to be achieved is selected more easily by downshifting one speed at a time. On a downhill ground, engine braking which is adequate at that tilting angle can be achieved more easily by downshifting one speed at a time. The vehicle speed threshold value is set to a vehicle speed which does not cause overrunning of the engine 31 at the rotational speed and torque corresponding to the vehicle speed even if the speed position of the transmission 33 is changed to the first speed.

The RAM 73 is a volatile semiconductor memory which temporarily holds a program and data.

The CPU 74 reads a program, threshold values and other data from the ROM 72 and decompresses them on the RAM 73 to execute the drive control program for the wheel loader 1 including the speed position changeover control of the transmission 33. Consequently, the CPU 74 functions as a control device which performs adequate speed position changeover control according to the working condition and traveling condition of the wheel loader 1.

Figure 9:
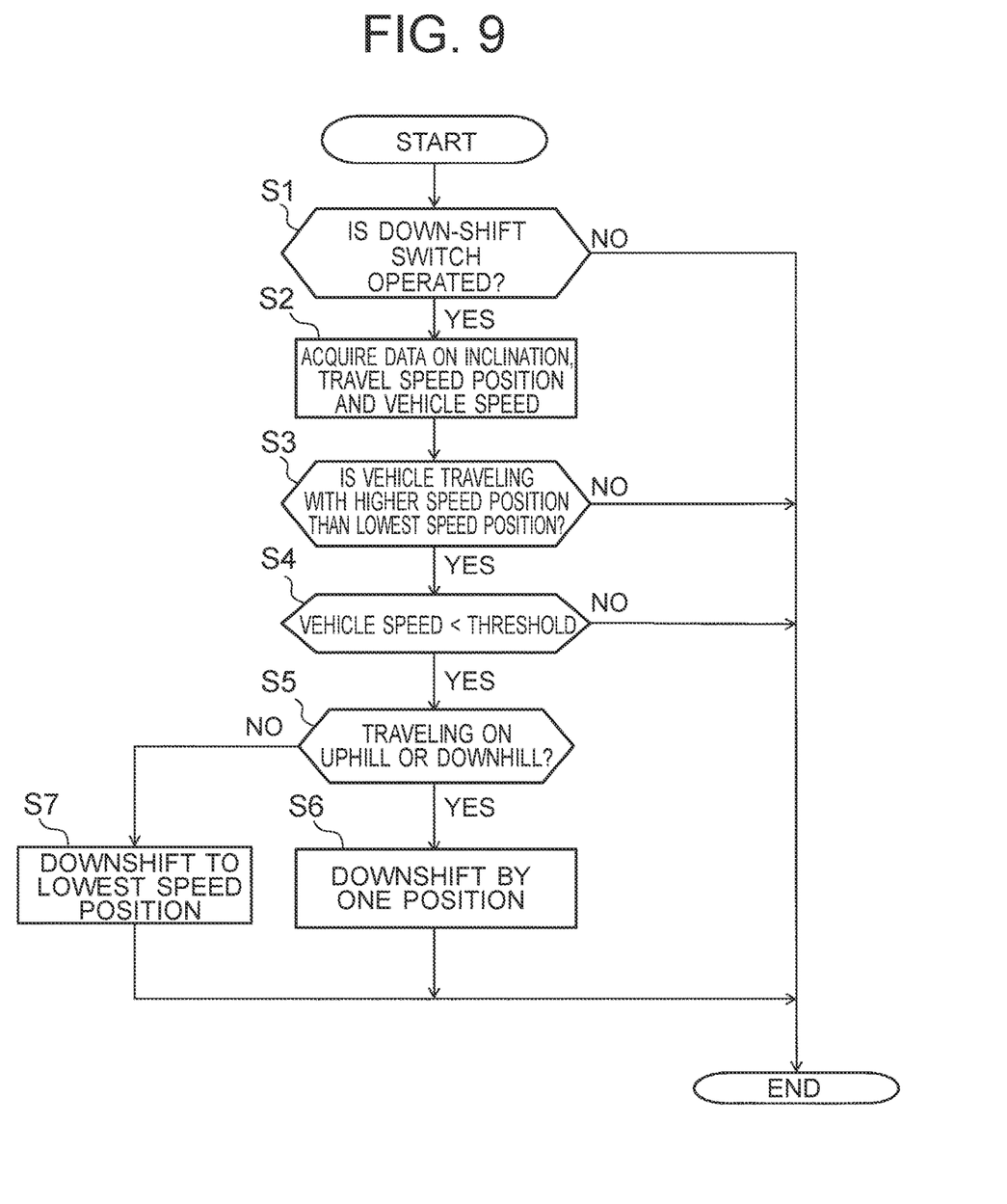
FIG. 9 is a flowchart which shows the processing sequence of speed position changeover of the wheel loader according to the embodiment.

Next, the processing sequence of speed position changeover control of the wheel loader 1 according to the embodiment will be explained referring to FIG. 9. FIG. 9 is a flowchart which shows the processing sequence of speed position changeover control of the wheel loader 1 according to the embodiment. The speed position changeover control process shown in FIG. 9 is performed according to the speed position changeover control program stored in the ROM 72 of the controller 44 even if either the first mode or the second mode is selected by the shift mode changeover switch 64a or 64b.

As the processing sequence of speed position changeover control is started, the controller 44 waits for the shiftdown switch 62 to be operated (YES at Step S1) and acquires various data including the tilting angle of the wheel loader 1, the speed position and the vehicle speed from the tilting angle sensor 9, transmission control device 45, and rotational speed sensor 39 (Step S2). Then, according to the acquired data, the controller 44 sequentially decides whether the wheel loader 1 is traveling with a higher speed position than the lowest speed position or not (Step S3), whether the vehicle speed is smaller than the vehicle speed threshold value or not (Step S4), and whether it is traveling on an uphill or a downhill or not (Step S5).

In case that it is decided at Step S3 that the wheel loader 1 is traveling with a higher speed position than the lowest speed position (YES), the sequence goes to Step S4 to decide whether or not the vehicle speed of the wheel loader 1 is smaller than the vehicle speed threshold value. The vehicle speed threshold value is read from the vehicle speed threshold storage 85 of the ROM 72.

In case that it is decided at Step S4 that the vehicle speed of the wheel loader 1 is smaller than the vehicle speed threshold value (YES), the sequence goes to Step S5 to decide whether it is traveling on an uphill or a downhill or not. In deciding whether the ground is an uphill or a downhill, in case that the tilting angle acquired from the tilting angle sensor 9 is larger than the tilting angle threshold value stored in the tilting angle threshold storage 84 of the ROM 72, the ground is decided to be an uphill and in case that it is smaller, the ground is decided to be a downhill.

In case that it is decided at Step S5 that the wheel loader 1 is traveling on an uphill or a downhill (YES), the sequence goes to Step S6 to downshift the transmission 33 one speed position by each operation of the shiftdown switch 62. This prevents overrunning of the engine 31. On the other hand, in case that it is decided at Step S5 that the wheel loader 1 is not traveling on an uphill or a downhill, namely it is traveling on a flat ground (NO), the sequence goes to Step S7 to downshift the speed position of the transmission 33 immediately to the first speed (lowest speed position) by a single operation of the shiftdown switch 62. This permits quick operation for excavation work during traveling on an uphill or for traveling on a steep uphill and a steep downhill.

The wheel loader 1 according to the embodiment permits the single shiftdown switch 62 to be used selectively to perform the control to downshift the speed position of the transmission 33 one speed position by each operation or the control to downshift it to the lowest speed position immediately by a single operation, so the system configuration of the wheel loader 1 can be simpler than when a plurality of shiftdown switches are provided and operational complexity can be resolved, leading to improvement in the operability of the wheel loader 1.

Furthermore, in the wheel loader 1 according to the embodiment, the first mode in which the speed position of the transmission 33 is downshifted one speed position by each operation of the shiftdown switch 62 and the second mode in which the speed position of the transmission 33 is downshifted to the lowest speed position by a single operation of the shiftdown switch 62 are set on the controller 44, and even if the speed position changeover control of the transmission 33 can be performed in one of the modes which is selected by the operator using the shift mode changeover switch 64, the mode can be automatically changed on a working scene and on a scene of traveling on an uphill or a downhill according to the tilting angle of the road surface, so the possibility of inadequate mode selection, for example, selection of the first mode on a working scene or selection of the second mode on a traveling scene, is eliminated and thus the working efficiency and operability can be improved.

In the above embodiment, the lowest speed position to which the transmission 33 is downshifted immediately by a single operation of the shiftdown switch 62 is assumed to be the first speed; however, instead, it can be the lowest speed position set by downshifting in Auto Shift 1 or Auto Shift 2 selected by the manual/auto shift control changeover switch 63 as mentioned above. In other words, in case that Auto Shift 1 is selected, the lowest speed position set immediately by downshifting by a single operation of the shiftdown switch 62 is the starting speed position of the transmission (second speed), and in case that Auto Shift 2 is selected, the lowest speed position set immediately by downshifting by a single operation of the shiftdown switch 62 is the first speed. Consequently, downshifting can be performed in the shift range intended by the operator. Alternatively, the lowest speed position to which the transmission 33 is downshifted immediately by a single operation of the shiftdown switch 62 may be not selected in the shift mode of the manual/auto shift control changeover switch 63, but it may be selected when the shift mode is changed by the shift mode changeover switch 64. Although in the embodiment the tilting angle sensor 9 is provided as means for detecting the tilting angle, means for calculating the tilting angle from the change in GPS coordinate data may be used.

The range of the present invention is not limited to the above embodiment, but it includes embodiments in which a modification, addition or deletion is made to the above embodiment as appropriate without departing from the gist of the present invention. For example, although in the above embodiment the wheel loader 1 as a work vehicle has been described by example, the present invention can be applied to other types of work vehicles such as dump trucks.

REFERENCE SIGNS LIST

1 . . . wheel loader,
8 . . . working device,
9 . . . tilting angle sensor,
11 . . . boom,
13 . . . bucket,
31 . . . engine,
32 . . . torque converter,
33 . . . transmission,
36, 37, 38 . . . rotational speed sensor,
39 . . . speed sensor,
44 . . . controller,
56 . . . display unit,
62 . . . shiftdown switch

The invention claimed is:

1. A work vehicle, comprising:
a vehicle body with a pair of wheels attached to each of a front and a rear;
a working device provided on the vehicle body;
an engine configured to generate a travel driving force for the vehicle body;
a transmission with a plurality of speed positions to which the driving force of the engine is transmitted through a torque converter;
a shiftdown switch configured to give the transmission a command to downshift the speed position by operation;
a speed sensor configured to detect a speed of the vehicle body; and
a transmission controller configured to control the speed position of the transmission according to a command signal given from the shiftdown switch or the speed of the vehicle body detected by the speed sensor,
wherein a tilting angle sensor configured to detect an inclination of the vehicle body is provided, and
the transmission controller takes the command signal given to the transmission by a single operation of the shiftdown switch as a command to downshift one speed position at a time or a command to downshift to a lowest speed position, according to the speed position of the transmission during traveling of the vehicle body, the speed of the vehicle body detected by the speed sensor, and the tilting angle detected by the tilting angle sensor,
wherein the transmission controller sends the transmission a command to downshift the speed position of the transmission to the lowest speed position by a single operation of the shiftdown switch in case that the vehicle body travels with the transmission in a higher speed position than the lowest speed position and the speed of the vehicle body detected by the speed sensor is smaller than a prescribed vehicle speed threshold value, and the tilting angle detected by the tilting angle sensor is decided to indicate neither an uphill nor a downhill.

2. A work vehicle, comprising:
a vehicle body with a pair of wheels attached to each of a front and a rear;
a working device provided on the vehicle body;
an engine configured to generate a travel driving force for the vehicle body;
a transmission with a plurality of speed positions to which the driving force of the engine is transmitted through a torque converter;
a shiftdown switch configured to give the transmission a command to downshift the speed position by operation;
a speed sensor configured to detect a speed of the vehicle body; and
a transmission controller configured to control the speed position of the transmission according to a command signal given from the shiftdown switch or the speed of the vehicle body detected by the speed sensor,
wherein a tilting angle sensor configured to detect an inclination of the vehicle body is provided, and
the transmission controller takes the command signal given to the transmission by a single operation of the shiftdown switch as a command to downshift one speed position at a time or a command to downshift to a lowest speed position, according to the speed position of the transmission during traveling of the vehicle body, the speed of the vehicle body detected by the speed sensor, and the tilting angle detected by the tilting angle sensor,
wherein the transmission controller sends the transmission a command to downshift the speed position of the transmission one speed position by each operation of the shiftdown switch in case that the vehicle body travels with the transmission in a higher speed position than the lowest speed position and the speed of the vehicle body detected by the speed sensor is smaller than a prescribed vehicle speed threshold value, and the tilting angle detected by the tilting angle sensor is decided to indicate an uphill or a downhill.

3. A work vehicle, comprising:
a vehicle body with a pair of wheels attached to each of a front and a rear;
a working device provided on the vehicle body;
an engine configured to generate a travel driving force for the vehicle body;
a transmission with a plurality of speed positions to which the driving force of the engine is transmitted through a torque converter;
a shiftdown switch configured to give the transmission a command to downshift the speed position by operation;
a speed sensor configured to detect a speed of the vehicle body; and
a transmission controller configured to control the speed position of the transmission according to a command signal given from the shiftdown switch or the speed of the vehicle body detected by the speed sensor,
wherein a tilting angle sensor configured to detect an inclination of the vehicle body is provided,
the transmission controller takes the command signal given to the transmission by a single operation of the shiftdown switch as a command to downshift one speed position at a time or a command to downshift to a lowest speed position, according to the speed position of the transmission during traveling of the vehicle body, the speed of the vehicle body detected by the speed sensor, and the tilting angle detected by the tilting angle sensor, and a shift mode changeover switch which changes between a first mode to send the transmission a command to downshift the speed position of the transmission one speed position by each operation of the shiftdown switch and a second mode to send the transmission a command to downshift to the lowest speed position by a single operation of the shiftdown switch, wherein the transmission controller sends the transmission a command to downshift the speed position of the transmission one speed position by each operation of the shiftdown switch in case that the vehicle body travels with the transmission in a higher speed position than the lowest speed position and the speed of the vehicle body detected by the speed sensor is smaller than a prescribed vehicle speed threshold value, and the tilting angle detected by the tilting angle sensor is decided to indicate an uphill or a downhill, even if the second mode is selected by the shift mode changeover switch.

* * * * *